(12) United States Patent
Sanders et al.

(10) Patent No.: US 7,287,811 B2
(45) Date of Patent: Oct. 30, 2007

(54) ASSEMBLY FOR COVERING AN OPENING

(75) Inventors: Joseph Petrus Johannes Sanders, Cuijk (NL); Pieter Antoon Peeters, Horst (NL)

(73) Assignee: Inalfa Roof Systems B.V., Venray (NL)

( * ) Notice: Subject to any disclaimer, the term of this patent is extended or adjusted under 35 U.S.C. 154(b) by 61 days.

(21) Appl. No.: 11/400,987

(22) Filed: Apr. 10, 2006

(65) Prior Publication Data

US 2006/0241352 A1     Oct. 26, 2006

(30) Foreign Application Priority Data

Apr. 14, 2005   (EP)   .................. 05102932

(51) Int. Cl.
*B60J 7/00* (2006.01)
*A47H 1/00* (2006.01)

(52) U.S. Cl. .............. 296/214; 160/265; 160/312

(58) Field of Classification Search ........... 296/214, 296/219; 160/265, 312
See application file for complete search history.

(56) References Cited

U.S. PATENT DOCUMENTS

| | | | | |
|---|---|---|---|---|
| 5,752,557 A | * | 5/1998 | Crider et al. | 160/121.1 |
| 5,960,847 A | * | 10/1999 | Crider et al. | 160/121.1 |
| 6,634,703 B1 | * | 10/2003 | De Gaillard | 296/214 |
| 7,204,548 B2 | * | 4/2007 | Wilms et al. | 296/214 |
| 2002/0195843 A1 | | 12/2002 | Glasl | |

FOREIGN PATENT DOCUMENTS

| | | |
|---|---|---|
| DE | 10215678 | 11/2003 |
| DE | 10336038 | 3/2005 |

OTHER PUBLICATIONS

European Patent Office in counterpart foreign application No. EP 05102932 filed Apr. 14, 2005.

* cited by examiner

*Primary Examiner*—Dennis H. Pedder
(74) *Attorney, Agent, or Firm*—Steven M. Koehler; Westman, Champlin & Kelly P.A.

(57) ABSTRACT

An assembly for covering an opening comprises a movable cover having a first flexible cover part that can be wound on or off a winding tube, a second rigid cover part attached to the first cover part at the end of latter remote from the winding tube and a third flexible cover part attached to the second cover part at the end of latter remote from the first cover part, wherein the free end of the third cover part extends around a reversing member which is movable by a first driving member, which free end is connected to a second driving member, and wherein the ratio between the winding velocity $V_1$ of the winding tube, and thus the first and second cover parts, the driving velocity $V_2$ of the first driving member and the driving velocity $V_3$ of the second driving member is such, that $V_1+V_3=2\ V_2$, whereas $V_3>V_2>V_1>0$.

12 Claims, 2 Drawing Sheets

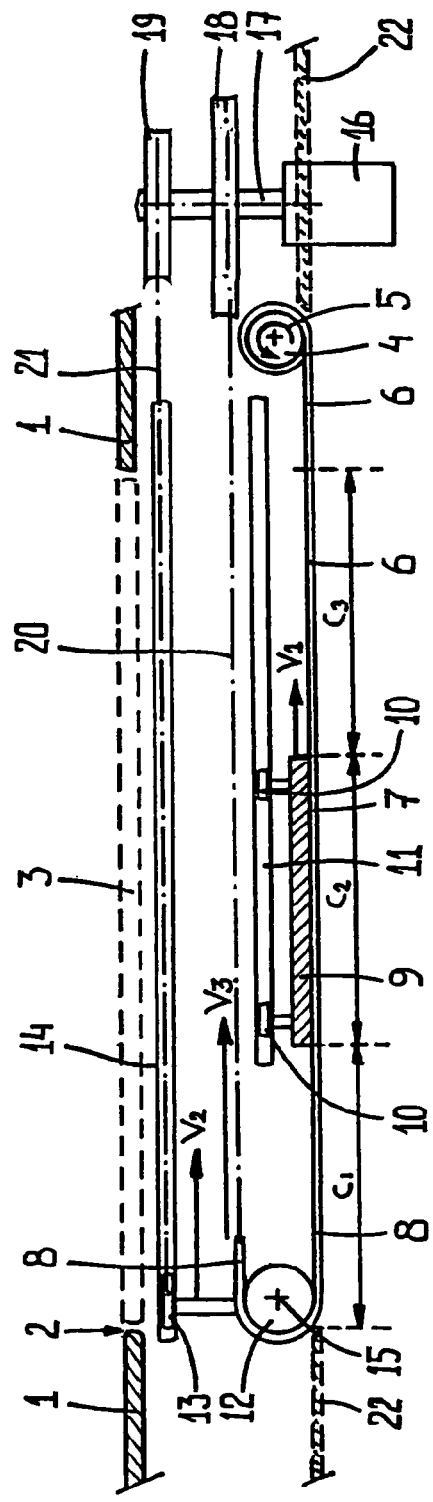
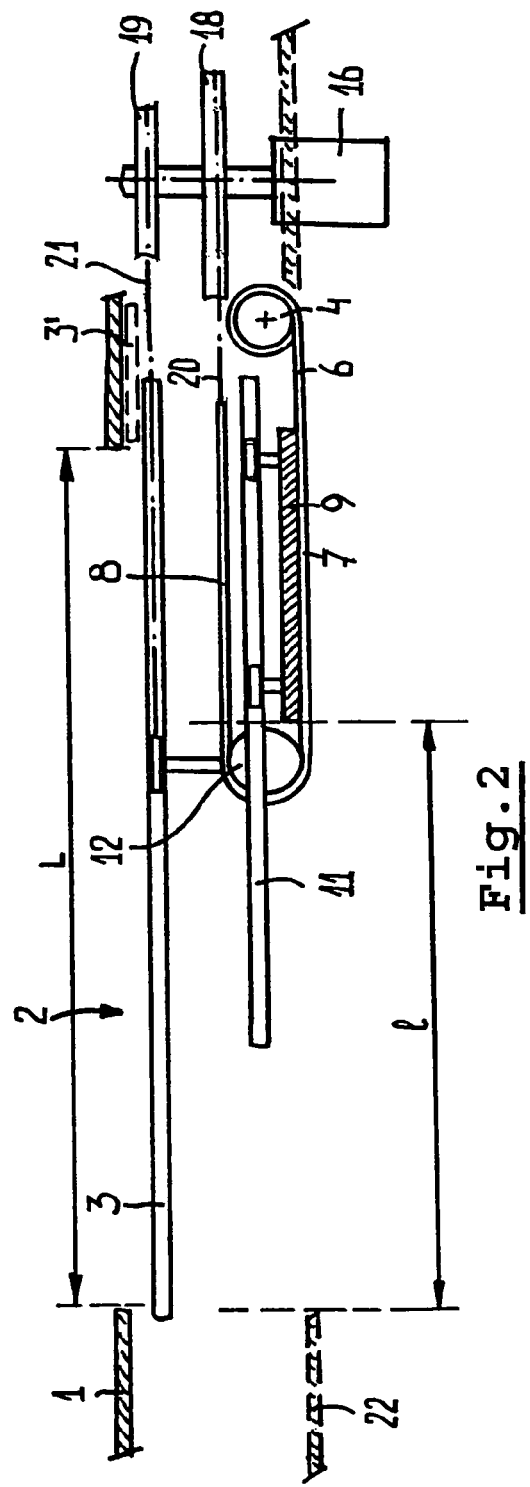

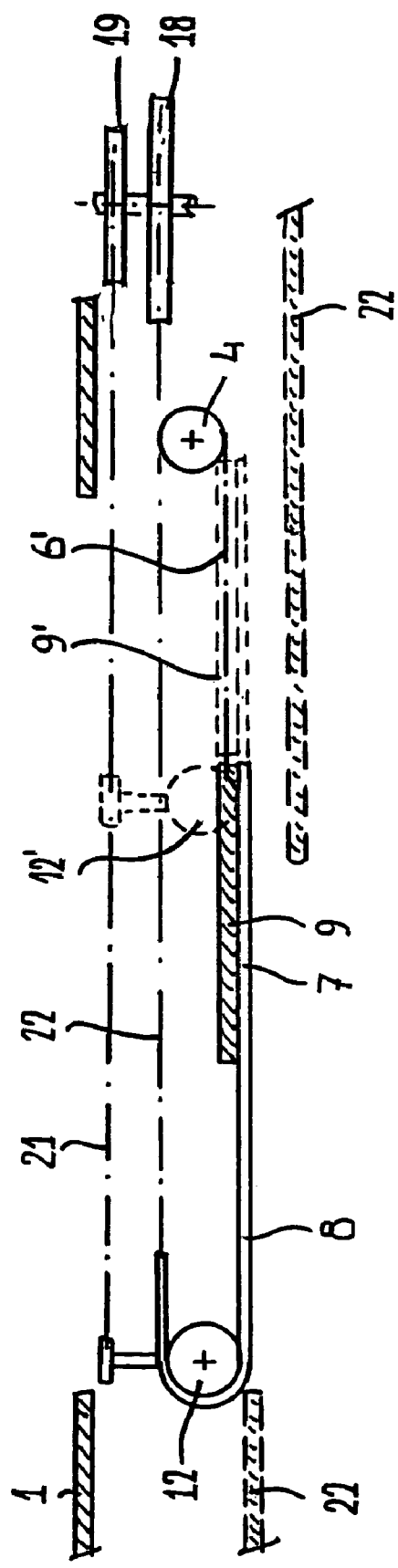

ASSEMBLY FOR COVERING AN OPENING

BACKGROUND OF THE INVENTION

The discussion below is merely provided for general background information and is not intended to be used as an aid in determining the scope of the claimed subject matter.

The invention relates to an assembly for covering an opening. Such an assembly for example may be used in combination with an open roof construction for a vehicle which comprises a roof opening provided in a stationary roof part and a movable closure panel for opening and closing the roof opening. Generally, the inner side of the vehicle roof is provided with a lining. When the roof opening is opened, such a lining also should be moved towards a position, in which the roof opening is open.

With ever increasing demands for larger roof openings and for an improved esthetical appearance of such a lining, problems arise, especially with respect to keeping the lining smooth and taut. Because of the large dimensions of the roof opening and because it is made of a flexible material, the lining is prone to sagging in its mid section.

Another use of an assembly of the type referred to above is for an open roof construction for a vehicle. Often, such an open roof construction is provided with a sunshade mechanism with a sunscreen which will cover the open roof opening. Also here the problems as expressed above will arise.

SUMMARY OF THE DESCRIPTION

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

Thus, in accordance with an aspect of the present invention, an assembly for covering an opening includes a movable cover having a first flexible cover part that can be wound on or off a winding tube, a second rigid cover part attached to the first cover part at the end of latter remote from the winding tube and a third flexible cover part attached to the second cover part at the end of latter remote from the first cover part. The free end of the third cover part extends around a reversing member, which is movable by a first driving member, and which free end is connected to a second driving member. The ratio between the winding velocity $V_1$ of the winding tube, and thus the first and second cover parts, the driving velocity $V_2$ of the first driving member and the driving velocity $V_3$ of the second driving member is such, that $V_1+V_3=2 V_2$, whereas $V_3>V_2>V_1>0$.

In the position of the movable cover in which it fully covers the opening, the first cover part, second cover part and third cover part are positioned adjacent each other. The rigid nature of the second cover part can diminish or even fully eliminate the sagging of the movable cover in its mid section. When the movable cover has to be moved towards a position in which the opening is open, the winding tube is allowed to wind on the first flexible cover part, thus also moving the second rigid cover part and the end of the third cover part connected therewith along in the same direction. At the same time, the first driving member is activated for moving the reversing member with an increased speed in the same direction, whereas simultaneously the second driving member moves the free end of the third cover in the same direction with a still further increased speed. As a result, the free end of the third cover part is moved around the moving reversing member, such that the free end of the third cover part moves in a direction towards the winding tube. When the rigid second cover part has reached the winding tube, the winding tube is deactivated and the movable cover has assumed a position, in which it at least partially frees the opening.

The assembly according to an aspect of the present invention provides an uninterrupted movable cover over its total length (thus providing a smooth surface over its total length) which has a pleasant esthetical appearance without any seams. When the winding tube is positioned immediately adjacent the opening, at least two thirds of the opening will be opened when the movable cover is moved towards a position for freeing the opening. In contrast to known systems, in which an assembly for covering an opening comprises a number of rigid panels, only a limited amount of space for storing the movable cover is needed. The rigid cover part substantially or completely eliminates any sagging of the movable cover, whereas further a perfect synchronisation of the movement of all cover parts is obtained. Finally, the reduced requirement for storage space allows the use of a number of alternative materials for the movable cover.

In one embodiment of the assembly, the first and second driving members comprise two pulleys cooperating with two flexible members attached to the reversing member and free end of the third cover part, respectively. As a result, a simple, yet nevertheless reliable driving mechanism is obtained.

When using such pulleys, a perfect synchronisation therebetween may be obtained, when said two pulleys are mounted on a common driving shaft and have an appropriate diameter ratio.

Preferably, the ratio between $V_1$, $V_2$ and $V_3$ is 1:2:3. In such a case the pulleys, if provided, will have a diameter ratio of 2:3.

The free end of the third cover part can move between the opening and the movable cover when the second driving member is activated. That means, that the free end of the third over part is hidden behind the movable cover, which is of advantage when, for example, the assembly is part of an open roof construction for a vehicle.

The flexible members can be push/pull cables which can take care of the movement of the movable cover between its extreme positions.

For maintaining the position of the second rigid cover part, such that it will not sag, it is possible that the second rigid cover part cooperates slidingly with guides extending along the opening. It is noted, that such guides also could be used for guiding the reversing member, However, the reversing member also could be guided in a different manner, for example by separate guides.

When, in accordance with yet another embodiment, the winding tube for the first cover part is preloaded in a direction for winding the first cover part thereon, consequently, it always will be assured, that the movable cover is kept in a taut position.

In most cases, the first cover part, second cover part and third cover part each substantially span one third of the entire total length of the opening. In such a case, substantially two thirds of the opening will be opened when the movable cover has been moved towards a position in which the first flexible cover part has been wound onto the winding tube.

As stated above, the opening may be an opening in a stationary roof of a vehicle. The movable cover may be part of the inner lining of such a vehicle roof, or, otherwise the movable cover part may be part of a sunshade mechanism. It is noted, however, that the use of the assembly is not limited to such applications.

BRIEF DESCRIPTION OF THE DRAWINGS

Hereinafter the invention will be elucidated while referring to the drawing. Herein:

FIG. 1 illustrates schematically an embodiment of an assembly for covering an opening in a closed position;

FIG. 2 shows the assembly of FIG. 1 in an open position, and

FIG. 3 shows an alternative embodiment of an assembly for covering an opening.

DETAILED DESCRIPTION OF THE ILLUSTRATIVE EMBODIMENTS

FIG. 1 shows part of a stationary roof 1 of a vehicle. In said stationary roof 1 a roof opening 2 is provided which can be opened and closed by a movable panel 3. Together with the stationary roof 1 and roof opening 2 the panel 3 defines a so-called open roof mechanism, which in its general construction is known from the state of the art and thus will not be elucidated further within the context of this description.

Below the stationary roof 1, near to one of the edges of the roof opening 2, a winding tube 4 is provided which, by means not illustrated (for example, spring means) is preloaded in a direction as indicated by arrow 5.

A movable cover comprises a first flexible cover part 6 that can be wound on or of the winding tube 4. A second rigid cover part 7 is attached to the first cover part 6 at the end of latter remote from the winding tube 4. A third flexible cover part 8 is attached to the second cover part 7 at the end of latter remote from the first cover part 6.

The second rigid cover part 7 comprises a support member 9 having slide shoes 10 which cooperate with guides 11 extending along the roof opening 2. It is noted, that in the illustrated embodiment the second rigid cover part 7 partially is made of the same flexible material as the first flexible cover part 6 and third flexible cover part 8, but that this second cover part obtains its rigidity because of its connection to the rigid support member 9 (which, for example, may comprise a plate member).

Further it is noted, that the indication 'rigid' is not limited to fully rigid; some flexibility may be present.

The free end of the third cover part 8 extends around a reversing member 12 which, by means of a slide shoe 13, can slide along a guide (or guides) 14 extending along the roof opening 2. The reversing member 12 may comprise a roller, which can rotate freely around an axis of rotation 15.

Underneath the stationary roof 1 a driving motor 16 is positioned having a driving shaft 17 onto which two pulleys 18 and 19 are mounted. Pulley 18 is connected to a flexible push/pull cable 20 which is attached to the free end of the third flexible cover part 8, whereas pulley 19 is connected to a push/pull cable 21 which is attached to the slide shoe 13 of the reversing member 12.

Finally FIG. 1 shows parts of a stationary inner lining 22 of the vehicle which nearly connect to the movable cover in its closed position as illustrated in FIG. 1. In this closed position the third flexible cover part 8 substantially spans one third (C1) of the entire total length (L, see FIG. 2) of the roof opening 2, the second cover part 7, 9 substantially spans one third (C2) of said total length, whereas also the first flexible cover part 6 substantially spans one third (C3) of the entire total length of the opening 2. It is noted, that both the first flexible cover part 6 and third flexible cover part 8 comprise sections which extend beyond the sections indicated by C1 and C3 (i.e. a section which surrounds the winding tube 4 and a section which surround the reversing member 12, respectively).

Before describing the operation of the assembly illustrated in FIG. 1, it is important to note that, in the illustrated embodiment, the pulleys 18 and 19 mounted on the common driving shaft 17 have a diameter ratio of 3:2.

The assembly operates as follows: the winding tube 4 is allowed to wind thereon the first flexible cover part 6 with a velocity V1, which velocity V1 then also will be the velocity with which the second rigid cover part 7, 9 moves towards the winding tube 4 (as well as the part of the third flexible cover part 8 attached to the second cover part 7). Simultaneously motor 16 is activated, such that the pulleys 18 and 19 will pull on the cables 20 and 21, thus moving the free end of the third flexible cover 8 towards the respective pulley 18 with a velocity V3 and moving the reversing member 12 towards the pulley 19 with a velocity V2. In the present embodiment the ratio between V1, V2 and V3 is 1:2:3.

As a result the entire movable cover is moved towards an open position as illustrated in FIG. 2, in which the free end of the third flexible cover 8 has been moved between the stationary roof 1 (or roof opening 2) and the remaining part of the movable cover. In such an open position at least two third of the roof opening 2 is exposed (distance 1 being two third of L). In this open position the movable panel 3 of course has been moved towards a position 3' in which it does not any longer obstruct the roof opening 2.

FIG. 3 illustrates a slightly amended embodiment, in which the fixed lining 22 has such a position that the movable cover in its open position is hidden therebehind. It is noted, that in FIG. 3 certain parts of the assembly have not been illustrated, but still will be part of said assembly (such as, for example, the guides 11 and 14, as well as motor 16). Further, now the first flexible cover part 6' is shaped as a pull cable which is windable onto winding tube 4. This first cover part 6' does not have a cover function anymore, it being positioned behind the fixed lining 22. The open position of the assembly is indicated in dotted lines, such as at 12' and 9' for the reversing member and support member of the second cover part, respectively.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

The invention claimed is:

1. An assembly for covering an opening, comprising a winding tube, a reversing member and a movable cover having a first flexible cover part that can be wound on or off the winding tube, a second rigid cover part attached to the first cover part at the end of latter remote from the winding tube and a third flexible cover part attached to the second cover part at the end of latter remote from the first cover part, wherein the free end of the third cover part extends around the reversing member which is movable by a first driving member, which free end is connected to a second driving member, and wherein the ratio between the winding velocity $V_1$ of the winding tube, and thus the first and second cover parts, the driving velocity $V_2$ of the first driving member and the driving velocity $V_3$ of the second driving member is such, that $V_1+V_3=2 V_2$, where $V_3>V_2>V_1>0$.

2. The assembly according to claim 1, wherein the first and second driving members comprise two pulleys cooperating with two flexible members attached to the reversing member and the free end of the third cover part, respectively.

3. The assembly according to claim 2, wherein said two pulleys are mounted on a common driving shaft and have an appropriate diameter ratio.

4. The assembly according to claim 1, wherein the ratio between $V_1$, $V_2$ and $V_3$ is 1:2:3.

5. The assembly according to claim 1, wherein the free end of the third cover part is adapted to move between the opening and the movable cover when the second driving member is activated.

6. The assembly according to claim 2, wherein said two pulleys are mounted on a common driving shaft and have an appropriate diameter ratio and the ratio between $V_1$, $V_2$ and $V_3$ is 1:2:3 and the free end of the third cover part is adapted to move between the opening and the movable cover when the second driving member is activated and wherein the flexible members are push/pull cables.

7. The assembly according to claim 1, wherein the second rigid cover part is adapted to cooperate slidingly with guides extending along the opening.

8. The assembly according to claim 1, wherein the winding tube for the first cover part is preloaded in a direction for winding thereon the first cover part.

9. The assembly according to claim 1, wherein the first cover part, second cover part and third cover part each substantially span one third of the entire total length of the opening.

10. The assembly according to claim 1, wherein the opening is an opening in a roof of a vehicle.

11. The assembly according to claim 10, wherein the movable cover is part of the inner lining of the vehicle roof.

12. The assembly according to claim 10, wherein the movable cover is part of a sunshade mechanism.

* * * * *